(12) United States Patent
Kuroiwa et al.

(10) Patent No.: US 6,975,730 B1
(45) Date of Patent: Dec. 13, 2005

(54) METHOD AND APPARATUS FOR CONTENTS INFORMATION

(75) Inventors: Toshio Kuroiwa, Yokohama (JP);
Takayuki Sugahara, Yokosuka (JP);
Wataru Inoha, Yokosuka (JP); Kenjiro Ueda, Yokosuka (JP); Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 955 days.

(21) Appl. No.: 09/726,433

(22) Filed: Dec. 1, 2000

(30) Foreign Application Priority Data

| Jan. 21, 2000 | (JP) | ............................ 2000-012733 |
| Feb. 28, 2000 | (JP) | ............................ 2000-051204 |

(51) Int. Cl.[7] .............................................. H04L 9/00
(52) U.S. Cl. ...................... 380/284; 380/44; 380/262; 380/247; 380/278; 713/171; 713/193
(58) Field of Search ............................... 380/230, 201, 380/262, 268, 277, 44, 284, 247, 278; 713/171, 713/189, 193

(56) References Cited

U.S. PATENT DOCUMENTS

| 5,230,020 | A | | 7/1993 | Hardy et al. | |
| 5,485,577 | A | * | 1/1996 | Eyer et al. | ................... 713/202 |
| 5,517,567 | A | * | 5/1996 | Epstein | ....................... 380/247 |
| 5,850,445 | A | * | 12/1998 | Chan et al. | .................. 380/247 |
| 5,970,144 | A | * | 10/1999 | Chan et al. | .................. 380/247 |
| 6,105,134 | A | * | 8/2000 | Pinder et al. | ................ 713/170 |
| 6,401,207 | B1 | * | 6/2002 | Funakoshi et al. | ........... 713/182 |
| 6,460,137 | B1 | * | 10/2002 | Akiyama et al. | ............ 713/160 |
| 6,463,151 | B1 | * | 10/2002 | Iitsuka et al. | ................ 380/201 |
| 6,535,607 | B1 | * | 3/2003 | Chandersekaran et al. | ... 380/286 |
| 6,587,562 | B1 | * | 7/2003 | Jansen et al. | ................ 380/262 |

FOREIGN PATENT DOCUMENTS

| DE | 19744293 C1 | 7/1999 |
| EP | 0258701 A2 | 3/1988 |
| JP | 10-269289 | 10/1998 |
| JP | 10-283268 | 10/1998 |

* cited by examiner

*Primary Examiner*—Gilberto Barron, Jr.
*Assistant Examiner*—Samson B. Lemma
(74) *Attorney, Agent, or Firm*—Louis Woo (57) ABSTRACT

A first-key signal representative of a first key is generated from first-key base information being a base of the first key. Contents information is encrypted into encryption-resultant contents information in response to the first-key signal. A second-key signal representative of a second key is generated on the basis of initial-value information of a given initial value according to a predetermined key generation algorithm. The first-key base information is encrypted into encryption-resultant first-key base information in response to the second-key signal. The encryption-resultant contents information, the encryption-resultant first-key base information, the initial-value information, and algorithm identification information for identifying the predetermined key generation algorithm are transmitted or recorded.

10 Claims, 3 Drawing Sheets

| ALGORITHM ID NUMBER | COEFFICIENT | PRIMITIVE POLYNOMIAL |
|---|---|---|
| 0 | (1, 1, 0, 0, 0, 0, 1, 1) | $x^8 + x^7 + x^2 + x + 1$ |
| 1 | (1, 0, 0, 0, 1, 1, 1, 0) | $x^8 + x^4 + x^3 + x^2 + 1$ |
| 2 | (1, 0, 1, 1, 0, 1, 0, 0) | $x^8 + x^6 + x^5 + x^3 + 1$ |
| 3 | (1, 1, 1, 1, 0, 0, 1, 1) | $x^8 + x^7 + x^6 + x^5 + x^2 + x + 1$ |
| 4 | (1, 0, 0, 1, 0, 1, 0, 1) | $x^8 + x^5 + x^3 + x + 1$ |
| 5 | (1, 0, 1, 1, 0, 0, 1, 0) | $x^8 + x^6 + x^5 + x^2 + 1$ |
| 6 | (1, 0, 1, 1, 0, 0, 0, 1) | $x^8 + x^6 + x^5 + x + 1$ |
| 7 | (1, 0, 1, 0, 1, 1, 1, 1) | $x^8 + x^6 + x^4 + x^3 + x^2 + x + 1$ |

METHOD AND APPARATUS FOR CONTENTS INFORMATION

BACKGROUND OF THE INVENTION

1. Field of the Invention

This invention relates to a method of transmitting contents information. Also, this invention relates to a method of recording contents information. In addition, this invention relates to an apparatus for transmitting contents information. Furthermore, this invention relates to an apparatus for recording contents information. Also, this invention relates to a transmission medium. In addition, this invention relates to a recording medium. Furthermore, this invention relates to a method of decrypting contents information. Also, this invention relates to an apparatus for decrypting contents information.

2. Description of the Related Art

Japanese published unexamined patent application 10-269289 discloses a system for managing the distribution of digital contents. In the system of Japanese application 10-269289, a distributor side encrypts and compresses digital contents into processing-resultant digital contents. The distributor side transmits the processing-resultant digital contents, an encryption-resultant contents key, and encryption-resultant accounting information to a communication opposite party. The distributor side implements a process of receiving a charge on the basis of contents use information transmitted from the communication opposite party. Then, the distributor side implements a process of dividing the received charge among interested persons including a copyright holder of the digital contents. On the other hand, a user side (a digital contents player) decrypts and expands the processing-resultant digital contents in response to the contents key, thereby reproducing the original digital contents. The user side subjects the accounting information to a reducing process responsive to the use of the digital contents. The user side transmits the reduced accounting information and the contents use information to the distributor side.

Japanese published unexamined patent application 10-283268 discloses a system in which a recording medium stores encryption-resultant main information, and also encryption-resultant information representing a key for decrypting the encryption-resultant main information. Non-encrypted information representing conditions of decrypting the encryption-resultant main information is added to the encryption-resultant key information. In more detail, the encryption-resultant key information has non-encrypted control information which contains device information and region information. The control information is designed to prevent the encryption-resultant main information from being copied onto a magnetic recording medium or an optical disc in a user side for illegal use thereof.

Generally, typical cryptosystems (encryption-decryption systems) are of a symmetric type and an asymmetric type. In the symmetric cryptosystem, a common key is used by both an encryption side and a decryption side. On the other hand, the asymmetric cryptosystem uses a public key and a secret key. The symmetric cryptosystem is better than the asymmetric cryptosystem in data processing rate.

In a known hybrid cryptosystem, an encryption side encrypts contents information in response to a contents key according to a symmetric cryptography, and transmits the encryption-resultant contents information to a decryption side. In addition, the encryption side encrypts the contents key according to an asymmetric cryptography, and transmits the encryption-resultant contents key to the decryption side.

It is known to set a common master key in both an encryption side and a decryption side. In this case, an encryption side encrypts a contents key in response to the master key according to a symmetric cryptography, and transmits the encryption-resultant contents key to the decryption side.

In a prior-art symmetric cryptosystem using a contents key and a master key, both an encryption side and a decryption side know cryptographic algorithms providing a cryptographic relation among a master key, a contents key, and contents information. Accordingly, it is possible to make an imitation of the decryption side, that is, an illegal machine of the decryption side, only from knowledge of the encryption side.

SUMMARY OF THE INVENTION

It is a first object of this invention to provide an improved method of transmitting contents information.

It is a second object of this invention to provide an improved method of recording contents information.

It is a third object of this invention to provide an improved apparatus for transmitting contents information.

It is a fourth object of this invention to provide an improved apparatus for recording contents information.

It is a fifth object of this invention to provide an improved transmission medium.

It is a sixth object of this invention to provide an improved recording medium.

It is a seventh object of this invention to provide an improved method of decrypting contents information.

It is an eighth object of this invention to provide an improved apparatus for decrypting contents information.

A first aspect of this invention provides a method of transmitting contents information. The method comprises the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; encrypting the first-key base information into encryption-resultant first-key base information in response to the second-key signal; and transmitting the encryption-resultant contents information, the encryption-resultant first-key base information, the initial-value information, and algorithm identification information for identifying the predetermined key generation algorithm.

A second aspect of this invention provides a method of recording contents information. The method comprises the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; encrypting the first-key base information into encryption-resultant first-key base information in response to the second-key signal; and recording the encryption-resultant contents information, the encryption-resultant first-key base information, the initial-value information, and algorithm identification information for identifying the predetermined key generation algorithm.

A third aspect of this invention provides an apparatus for transmitting contents information. The apparatus comprises means for generating a first-key signal representative of a first key from first-key base information being a base of the first key; means for encrypting contents information into encryption-resultant contents information in response to the first-key signal; means for generating a second-key signal representative of a second key on the basis of initial-value information of a given initial value according to a predetermined key generation algorithm; means for encrypting the first-key base information into encryption-resultant first-key base information in response to the second-key signal; and means for transmitting the encryption-resultant contents information, the encryption-resultant first-key base information, the initial-value information, and algorithm identification information for identifying the predetermined key generation algorithm.

A fourth aspect of this invention provides an apparatus for recording contents information. The apparatus comprises means for generating a first-key signal representative of a first key from first-key base information being a base of the first key; means for encrypting contents information into encryption-resultant contents information in response to the first-key signal; means for generating a second-key signal representative of a second key on the basis of initial-value information of a given initial value according to a predetermined key generation algorithm; means for encrypting the first-key base information into encryption-resultant first-key base information in response to the second-key signal; and means for recording the encryption-resultant contents information, the encryption-resultant first-key base information, the initial-value information, and algorithm identification information for identifying the predetermined key generation algorithm.

A fifth aspect of this invention provides a transmission medium for transmitting encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting the first-key base information into encryption-resultant first-key base information in response to the second-key signal; and wherein the algorithm identification information is for identifying the predetermined key generation algorithm.

A sixth aspect of this invention provides a recording medium loaded with encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting the first-key base information into encryption-resultant first-key base information in response to the second-key signal; and wherein the algorithm identification information is for identifying the predetermined key generation algorithm.

A seventh aspect of this invention is based on the third aspect thereof, and provides an apparatus wherein the means for generating the second-key signal comprises a linear feedback shift register using a specified irreducible primitive polynomial.

An eighth aspect of this invention provides a method of transmitting contents information. The method comprises the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; encrypting a part of the first-key base information in response to the second-key signal to convert the first-key base information into encryption-resultant first-key base information; and transmitting the encryption-resultant contents information, the encryption-resultant first-key base information, the initial-value information, and algorithm identification information for identifying the predetermined key generation algorithm.

A ninth aspect of this invention provides a method of recording contents information. The method comprises the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; encrypting a part of the first-key base information in response to the second-key signal to convert the first-key base information into encryption-resultant first-key base information; and recording the encryption-resultant contents information, the encryption-resultant first-key base information, the initial-value information, and algorithm identification information for identifying the predetermined key generation algorithm.

A tenth aspect of this invention provides an apparatus for transmitting contents information. The apparatus comprises means for generating a first-key signal representative of a first key from first-key base information being a base of the first key; means for encrypting contents information into encryption-resultant contents information in response to the first-key signal; means for generating a second-key signal representative of a second key on the basis of initial-value information of a given initial value according to a predetermined key generation algorithm; means for encrypting a part of the first-key base information in response to the second-key signal to convert the first-key base information into encryption-resultant first-key base information; and means for transmitting the encryption-resultant contents information, the encryption-resultant first-key base information, the initial-value information, and algorithm identification information for identifying the predetermined key generation algorithm.

An eleventh aspect of this invention provides an apparatus for recording contents information. The apparatus comprises means for generating a first-key signal representative of a first key from first-key base information being a base of the first key; means for encrypting contents information into encryption-resultant contents information in response to the first-key signal; means for generating a second-key signal representative of a second key on the basis of initial-value information of a given initial value according to a predetermined key generation algorithm; means for encrypting a part of the first-key base information in response to the second-key signal to convert the first-key base information into encryption-resultant first-key base information; and means for recording the encryption-resultant contents information, the encryption-resultant first-key base information, the initial-value information, and algorithm identification information for identifying the predetermined key generation algorithm.

A twelfth aspect of this invention provides a transmission medium for transmitting encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting a part of the first-key base information in response to the second-key signal to convert the first-key base information into encryption-resultant first-key base information; and wherein the algorithm identification information is for identifying the predetermined key generation algorithm.

A thirteenth aspect of this invention provides a recording medium loaded with encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting a part of the first-key base information in response to the second-key signal to convert the first-key base information into encryption-resultant first-key base information; and wherein the algorithm identification information is for identifying the predetermined key generation algorithm.

A fourteenth aspect of this invention is based on the tenth aspect thereof, and provides an apparatus wherein the means for generating the second-key signal comprises a linear feedback shift register using a specified irreducible primitive polynomial.

A fifteenth aspect of this invention provides a method of decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting the first-key base information into encryption-resultant first-key base information in response to the second-key signal. The method comprises the steps of identifying the predetermined key generation algorithm in response to algorithm identification information for identifying the predetermined key generation algorithm; generating a second-key signal representative of a second key on the basis of the initial-value information and the identified key generation algorithm; decrypting encryption-resultant first-key base information into original first-key base information in response to the second-key signal; generating a first-key signal representative of a first key from the original first-key base information; and decrypting encryption-resultant contents information into original contents information in response to the first-key signal.

A sixteenth aspect of this invention provides an apparatus for decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting the first-key base information into encryption-resultant first-key base information in response to the second-key signal. The apparatus comprises means for identifying the predetermined key generation algorithm in response to algorithm identification information for identifying the predetermined key generation algorithm; means for generating a second-key signal representative of a second key on the basis of the initial-value information and the identified key generation algorithm; means for decrypting encryption-resultant first-key base information into original first-key base information in response to the second-key signal; means for generating a first-key signal representative of a first key from the original first-key base information; and means for decrypting encryption-resultant contents information into original contents information in response to the first-key signal.

A seventeenth aspect of this invention is based on the sixteenth aspect thereof, and provides an apparatus wherein the identifying means comprises means for selecting one from among a plurality of key generation algorithms in response to the algorithm identification information as the identified key generation algorithm.

An eighteenth aspect of this invention is based on the seventeenth aspect thereof, and provides an apparatus wherein the means for generating the second-key signal comprises a linear feedback shift register having a feedback object position which is set in accordance with a primitive polynomial in the identified key generation algorithm.

A nineteenth aspect of this invention provides a method of decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting a part of the first-key base information in response to the second-key signal to convert the first-key base information into encryption-resultant first-key base information. The method comprises the steps of identifying the predetermined key generation algorithm in response to algorithm identification information for identifying the predetermined key generation algorithm; generating a second-key signal representative of a second key on the basis of the initial-value information and the identified key generation algorithm; decrypting encryption-resultant first-key base information into original first-key base information in response to the second-key signal; generating a first-key signal representative of a first key from the original first-key base information; and decrypting encryption-resultant contents information into original contents information in response to the first-key signal.

A twentieth aspect of this invention provides an apparatus for decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to a predetermined key generation algorithm; and encrypting a part of the first-key base information in response to the second-key signal to convert the first-key base information into encryption-resultant first-key base information. The apparatus comprises means for identifying the predetermined key generation algorithm in response to algorithm identification information for identifying the predetermined key generation algorithm; means for generating a second-key signal representative of a second key on the basis of the initial-value information and the identified key generation algorithm; means for decrypting encryption-resultant first-key base information into original first-key base information in response to the second-key signal; means for generating a first-key signal representative of a first key from the original first-key base information; and means for decrypting encryption-resultant contents information into original contents information in response to the first-key signal.

A twenty-first aspect of this invention is based on the twentieth aspect thereof, and provides an apparatus wherein the identifying means comprises means for selecting one from among a plurality of key generation algorithms in response to the algorithm identification information as the identified key generation algorithm.

A twenty-second aspect of this invention is based on the twenty-first aspect thereof, and provides an apparatus wherein the means for generating the second-key signal comprises a linear feedback shift register having a feedback object position which is set in accordance with a primitive polynomial in the identified key generation algorithm.

DESCRIPTION OF THE PREFERRED EMBODIMENT

Figure 1:
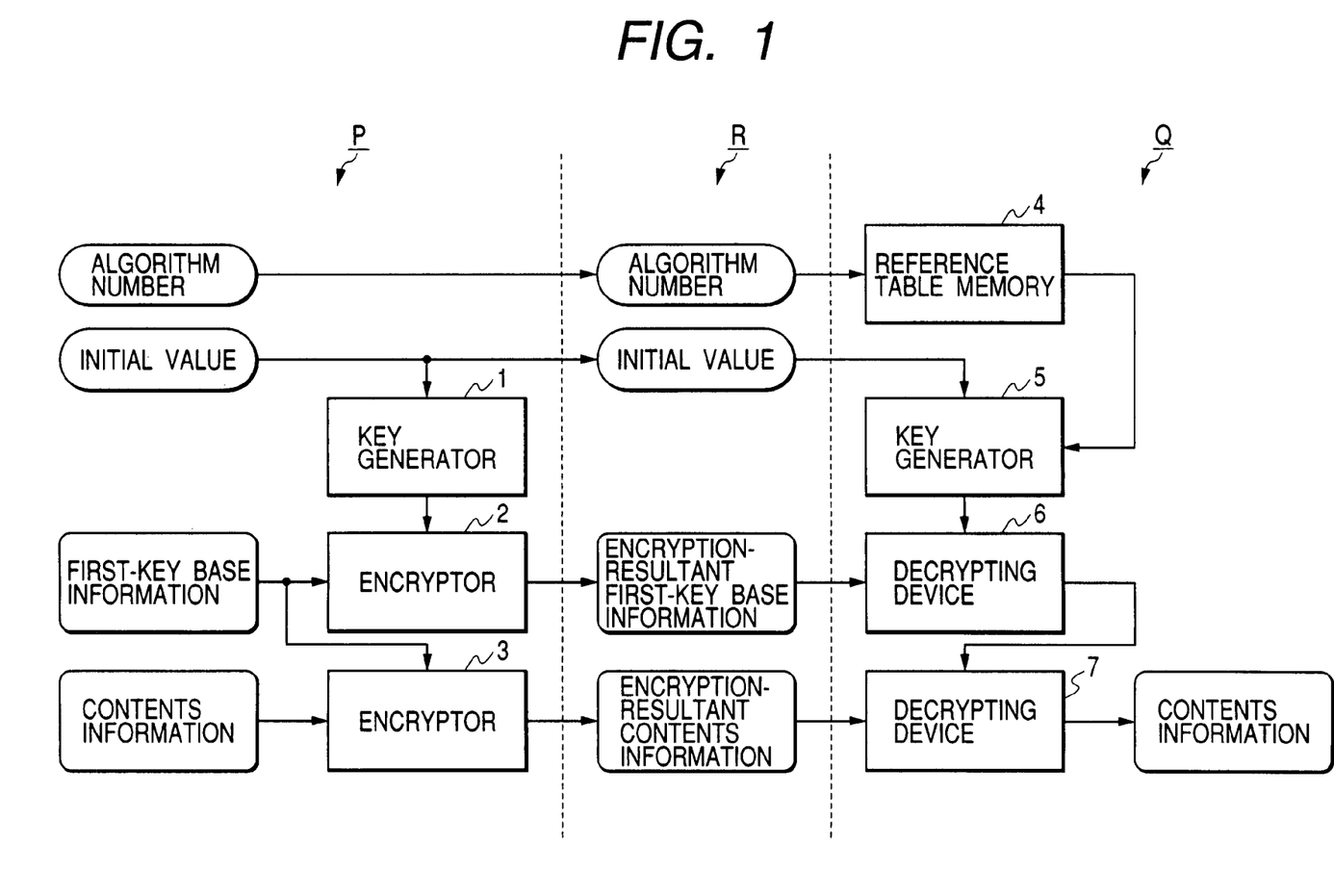
FIG. 1 is a block diagram of a system for contents information according to an embodiment of this invention.

FIG. 1 shows a system for contents information according to an embodiment of this invention. The system of FIG. 1 includes a primary section P, a secondary section Q, and an intermediate section R. The primary section P and the secondary section Q are connected to each other via the intermediate section R.

The primary section P includes an information recording apparatus or an information transmitting apparatus. The secondary section Q includes an information reproducing apparatus or an information receiving apparatus. An example of the information reproducing apparatus is an information player. The intermediate section R includes a recording medium or a transmission medium. Examples of the recording medium are a magnetic recording medium, an optical recording medium, and a semiconductor memory. Examples of the transmission medium are an optical fiber cable, electric wires, and a radio transmission line. The transmission medium is also referred to as a transmission line.

The primary section P includes a key generator 1 and encryptors 2 and 3. The encryptor 3 receives information being a base of a first key (a contents key). The first-key base information is fed from a suitable device (not shown). In addition, the encryptor 3 receives contents information from a suitable device (not shown). The encryptor 3 has a calculating block and an encrypting block. The calculating block in the encryptor 3 generates a signal (data) representative of the first key from the first-key base information. The encrypting block in the encryptor 3 encrypts the contents information into encryption-resultant contents information in response to the first-key signal. The encryptor 3 outputs the encryption-resultant contents information to the intermediate section R. The encryption by the encryptor 3 may be based on a known encryption algorithm such as DES.

Specifically, the primary section P records the encryption-resultant contents information on the recording medium of the intermediate section R, or transmits the encryption-resultant contents information to the transmission line of the intermediate section R.

The key generator 1 receives information representative of an initial value from a suitable device (not shown). The key generator 1 produces a signal representative of a second key from the initial-value information according to a key generation algorithm. The key generator 1 outputs the second-key signal to the encryptor 2.

The encryptor 2 receives the first-key base information. The encryptor 2 encrypts the first-key base information into encryption-resultant first-key base information in response to the second-key signal. The encryptor 2 outputs the encryption-resultant first-key base information to the intermediate section R. The encryption by the encryptor 2 may be based on a known encryption algorithm such as DES.

Specifically, the primary section P records the encryption-resultant first-key base information on the recording medium of the intermediate section R, or transmits the encryption-resultant first-key base information to the transmission line of the intermediate section R.

The encryptor 2 may encrypt a part of the first-key base information in response to the second-key signal. For example, the encryptor 2 encrypts only an important portion of the first-key base information. Alternatively, the encryptor 2 may encrypt the whole of the first-key base information.

The primary section P outputs the initial-value information to the intermediate section R. Specifically, the primary section P records the initial-value information on the recording medium of the intermediate section R, or transmits the initial-value information to the transmission line of the intermediate section R.

Information representative of an identification (ID) number of the key generation algorithm used by the key generator 1 is available in the primary section P. For example, the algorithm-number information is fed from a suitable device (not shown). The primary section P outputs the algorithm-number information to the intermediate section R. Specifically, the primary section P records the algorithm-number information on the recording medium of the intermediate section R, or transmits the algorithm-number information to the transmission line of the intermediate section R.

Preferably, the primary section P has a multiplexer which combines the algorithm-number information, the initial-value information, the encryption-resultant first-key base information, and the encryption-resultant contents information into multiplexing-resultant information of a predetermined format. In this case, the primary section P outputs the multiplexing-resultant information to the intermediate section R. Specifically, the primary section P records the multiplexing-resultant information on the recording medium of the intermediate section R, or transmits the multiplexing-resultant information to the transmission line of the intermediate section R.

The primary section P may include signal converters which change the algorithm-number information and the initial-value information according to predetermined functions. In this case, the primary section P outputs the change-resultant algorithm-number information and the change-resultant initial-value information to the intermediate section R. Specifically, the primary section P records the change-resultant algorithm-number information and the change-resultant initial-value information on the recording medium of the intermediate section R, or transmits the change-resultant algorithm-number information and the change-resultant initial-value information to the transmission line of the intermediate section R.

The second key produced by the key generator 1 acts as a higher-rank key with respect to the first key (the contents key). Preferably, the second key is designed to change randomly and greatly in response to the initial value.

Figure 2:
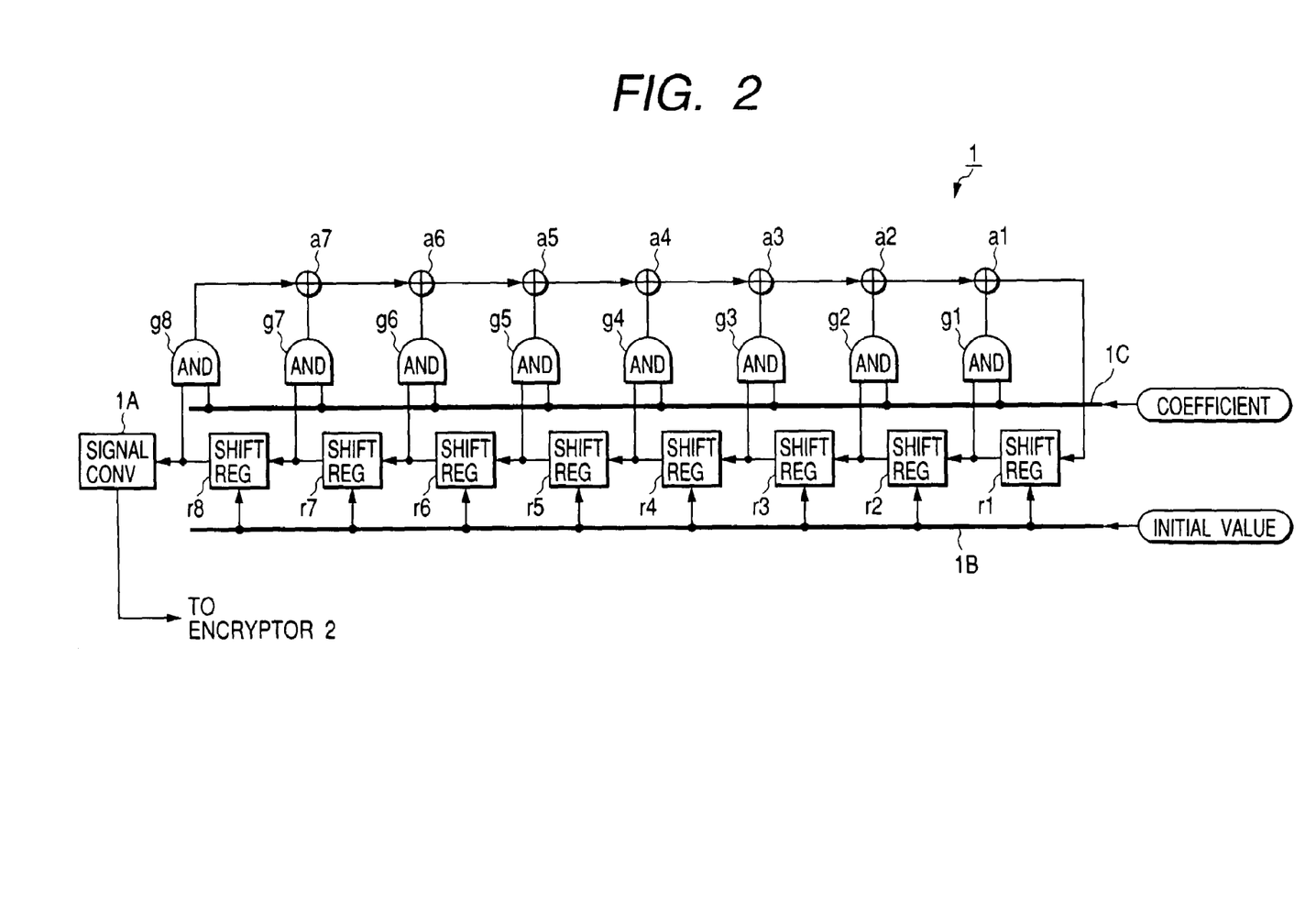
FIG. 2 is a block diagram of a key generator in a primary side of the system in FIG. 1.

The key generator 1 includes a circuit having N bits, where N denotes a predetermined natural number. FIG. 2 shows an example of the key generator 1. In the key generator 1 of FIG. 2, an included circuit has 8 bits, and thus N=8.

The key generator 1 in FIG. 2 includes 1-bit shift registers r1–r8, AND gates g1–g8, Exclusive-OR gates a1–a7, a signal converter 1A, and multi-bit (8-bit) buses 1B and 1C. The shift registers r1–r8, the AND gates g1–g8, and the Exclusive-OR gates a1–a7 are combined to form a linear feedback shift register (LFSR) having 8 bits (N=8).

The shift registers r1–r8 are connected in a linear array or a series array. Setting terminals of the shift registers r1–r8 are connected to bit lines of the bus 1B, respectively. First input terminals of the AND gates g1–g8 are connected to bit lines of the bus 1C, respectively. Second input terminals of the AND gates g1–g8 are connected to the output terminals of the shift registers r1–r8, respectively. The output terminals of the AND gates g1–g7 are connected to first input terminals of the Exclusive-OR gate a1–a7, respectively. The output terminal of the AND gate g8 is connected to a second input terminal of the Exclusive-OR gate a7. The output terminal of the Exclusive-OR gate a7 is connected to a second input terminal of the Exclusive-OR gate a6. The output terminal of the Exclusive-OR gate a6 is connected to a second input terminal of the Exclusive-OR gate a5. The output terminal of the Exclusive-OR gate a5 is connected to a second input terminal of the Exclusive-OR gate a4. The output terminal of the Exclusive-OR gate a4 is connected to a second input terminal of the Exclusive-OR gate a3. The output terminal of the Exclusive-OR gate a3 is connected to a second input terminal of the Exclusive-OR gate a2. The output terminal of the Exclusive-OR gate a2 is connected to a second input terminal of the Exclusive-OR gate a1. The output terminal of the Exclusive-OR gate a1 is connected to the input terminal of the shift register r1. The input terminal of the signal converter 1A is connected to the output terminal of the shift register r8. The output terminal of the signal generator 1A leads to the encryptor 2 (see FIG. 1).

Bits of the information representative of the initial value are fed via the bus 1B to the shift registers r2–r8, respectively. The bits of the initial-value information are set in the shift registers r2–r8, respectively. At least one of the bits of the initial-value information differs from "0". Bits of information representative of a coefficient are fed via the bus 1C to the first input terminals of the AND gates g1–g8, respectively. Each of the AND gates g1–g8 assumes a closed state or an open state (a conductive state or a non-conductive state) in accordance with the logic state of a related bit of the coefficient information. Thereafter, a clock signal is fed from a suitable device (not shown) to the shift registers r1–r8 so that 1-bit signals are moved in the shift-register array toward the signal converter 1A. Open ones (conductive ones) of the AND gates g1–g8 conduct the output signals from related shift registers to related Exclusive-OR gates. The positions of open ones of the AND gates g1–g8 correspond to positions in the shift-register array from which 1-bit signals are fed back. The positions of open ones of the AND gates g1–g8 are determined by the coefficient information. On the other hand, closed ones (non-conductive ones) of the AND gates g1–g8 output "0" signals to related Exclusive-OR gates, and do not conduct the output signals from related shift registers to the related Exclusive-OR gates. The Exclusive-OR gates a1–a7 execute Exclusive-OR operation with respect to the output signals from the AND gates g1–g8. A final result of the Exclusive-OR operation is fed back from the lowest-place Exclusive-OR gate a1 to the input terminal of the lowest-place shift register r1. The output signal from the highest-place shift register r8 is an maximum length code signal.

The signal converter 1A receives the maximum length code signal from the highest-place shift register r8. The signal converter 1A changes the maximum length code signal into the second-key signal according to a predetermined nonlinear function based on, for example, a nonlinearity of a multiplier. The signal converter 1A outputs the second-key signal to the encryptor 2 (see FIG. 1).

Preferably, the coefficient, the information of which is fed to the AND gates g1–g8, corresponds to a specified N-order irreducible primitive polynomial. The following 8-order primitive polynomial is taken as an example.

$$x^8 + x^7 + x^2 + x + 1 \tag{1}$$

In the case of the polynomial (1), the coefficient information has bits being "1", "1", "0", "0", "0", "0", "1", and "1" respectively. In this case, "1", "1", "0", "0", "0", "0", "1", and "1" are fed to the AND gates g8, g7, g6, g5, g4, g3, g2, and g1, respectively.

A specified primitive polynomial corresponding to the coefficient information defines a key generation algorithm used in the key generator 1. Accordingly, the identification number (the ID number) of the key generation algorithm is uniquely determined for the specified primitive polynomial.

The algorithm-number information, the initial-value information, the encryption-resultant first-key base information, and the encryption-resultant contents information are transmitted from the primary section P to the secondary section Q through the intermediate section R.

The secondary section Q includes a memory 4, a key generator 5, and decrypting devices 6 and 7. The memory 4 uses, for example, a ROM. The memory 4 stores data representing a reference table of algorithm identification (ID) numbers, coefficients, and primitive polynomials. The reference table is designed to identify a key generation algorithm (a coefficient) from algorithm-number information. In the reference table, the coefficients are located at different addresses determined by the algorithm ID numbers, respectively. Similarly, the primitive polynomials are located at different addresses determined by the algorithm ID numbers, respectively.

Figure 3:
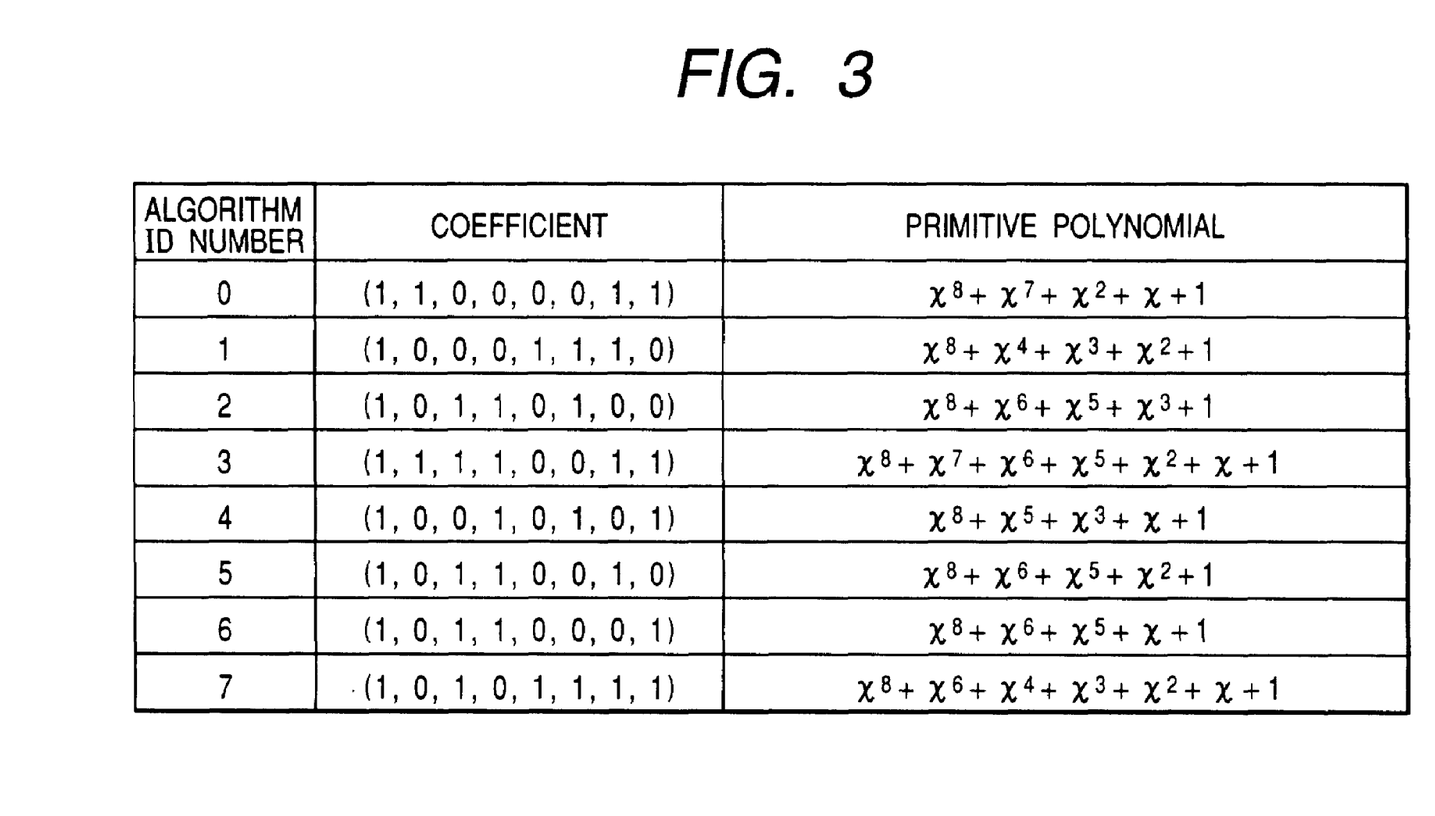
FIG. 3 is a diagram of a reference table represented by data stored in a memory in a secondary side of the system in FIG. 1.

FIG. 3 shows an example of the reference table in the memory 4. In the reference table of FIG. 3, the algorithm ID number "0" is assigned to a coefficient having bits equal to "1", "1", "0", "0", "0", "0", "1", and "1". Thus, the algorithm ID number "0" is assigned to the polynomial "$x^8+x^7+x^2+x+1$". The algorithm ID number "1" is assigned to a coefficient having bits equal to "1", "1", "0", "0", "0", "1", "1", and "0". Thus, the algorithm ID number "1" is assigned to the polynomial "$x^8+x^4+x^3+x^2+1$". The algorithm ID number "2" is assigned to a coefficient having bits equal to "1", "0", "1", "1", "0", "1", "0", and "0". Thus, the algorithm ID number "2" is assigned to the polynomial "$x^8+x^6+x^5+x^3+1$". The algorithm ID number "3" is assigned to a coefficient having bits equal to "1", "1", "1", "1", "0", "0", "1", and "1". Thus, the algorithm ID number "3" is assigned to the polynomial "$x^8+x^7+x^6+x^5+x^2+x+1$". The algorithm ID number "4" is assigned to a coefficient having bits equal to "1", "0", "0", "1", "0", "1", "0", and "1". Thus, the algorithm ID number "4" is assigned to the polynomial "$x^8+x^5+x^3+x+1$". The algorithm ID number "5" is assigned to a coefficient having bits equal to "1", "0", "1", "1", "0", "0", "1", and "0". Thus, the algorithm ID number "5" is assigned to the polynomial "$x^8+x^6+x^5+x^2+1$". The algorithm ID number "6" is assigned to a coefficient having bits equal to "1", "0", "1", "1", "0", "0", "0", and "1". Thus, the algorithm ID number "6" is assigned to the polynomial "$x^8+x^6+x^5+x+1$". The algorithm ID number "7" is assigned to a coefficient having bits equal to "1", "0", "1", "0", "1", "1", "1", and "1". Thus, the algorithm ID number "7" is assigned to the polynomial "$x^8+x^6+x^4+x^3+x^2+x+1$".

The memory 4 receives the algorithm-number information from the intermediate section R. The received algorithm-number information is used as an address signal, and the reference table in the memory 4 is accessed in response to the address signal. As a result, a coefficient and a primitive polynomial corresponding to the received algorithm-number information are identified. In other words, a key generation algorithm corresponding to the received algorithm-number information is identified. The memory 4 outputs information of the identified coefficient to the key generator 5.

The key generator 5 is similar in design and operation to the key generator 1 of the primary section P. The key generator 5 receives the initial-value information from the intermediate section R. The key generator 5 reproduces the second-key signal from the initial-value information and the coefficient information. The key generator 5 outputs the reproduced second-key signal to the decrypting device 6.

The decrypting device 6 receives the encryption-resultant first-key base information from the intermediate section R. Operation of the decrypting device 6 is inverse with respect to that of the encryptor 2 in the primary section P. The decrypting device 6 decrypts the encryption-resultant first-key base information into the first-key base information in response to the second-key signal. The decrypting device 6 outputs the first-key base information to the decrypting device 7.

The decrypting device 7 receives the encryption-resultant contents information from the intermediate section R. Operation of the decrypting device 7 is inverse with respect to that of the encryptor 3 in the primary section P. The decrypting device 7 has a calculating block and a decrypting block. The calculating block in the decrypting device 7 generates a signal (data) representative of the first key from the first-key base information. The decrypting block in the decrypting device 7 decrypts the encryption-resultant contents information into the original contents information in response to the first-key signal. Thus, the decrypting device 7 reproduces the original contents information. The decrypting device 7 outputs the reproduced contents information.

In the case where the primary section P includes the multiplexer, the secondary section Q has a demultiplexer which receives the multiplexing-resultant information from the intermediate section R. The demultiplexer separates the multiplexing-resultant information signal into the algorithm-number information, the initial-value information, the encryption-resultant first-key base information, and the encryption-resultant contents information. The demultiplexer feeds the algorithm-number information, the initial-value information, the encryption-resultant first-key base information, and the encryption-resultant contents information to the memory 4, the key generator 5, the decrypting device 6, and the decrypting device 7, respectively.

In the case where the primary section P includes the signal converters, the secondary section Q has inverse signal converters which receive the change-resultant algorithm-number information and the change-resultant initial-value information. The inverse signal converters return the change-resultant algorithm-number information and the change-resultant initial-value information to the original algorithm-number information and the original initial-value information, respectively. The inverse signal converters feed the the original algorithm-number information and the original initial-value information to the memory 4 and the key generator 5, respectively.

Preferably, the secondary side Q is formed by an LSI (large-scale integration) circuit having a single body. In this case, it is difficult to illegally access the memory 4 from an external.

In the system of FIG. 1, since the reference table is provided only in the memory 4 of the secondary section Q, it is difficult to make an imitation of the secondary side Q (that is, an illegal machine of the secondary side Q) only from knowledge of the primary section P. In the event that an illegal machine of the secondary side Q is found, the key generation algorithm used by the primary side P and the algorithm-number information transmitted from the primary side P to the secondary side Q are changed to make the illegal machine inoperative.

The embodiment of this invention may be modified as follows. Specifically, a modification of the embodiment of this invention provides M information pieces composing information being a base of a first key (a contents key), where M denotes a predetermined natural number. In this case, encryption of the first-key base information is executed through M stages. The encryption-resultant M information pieces are recorded or transmitted as the encryption-resultant first-key base information.

What is claimed is:

1. A method of transmitting contents information, comprising the steps of:

generating a first-key signal representative of a first key from first-key base information being a base of the first key;

encrypting contents information into encryption-resultant contents information in response to the first-key signal;

generating a second-key signal representative of a second key on the basis of initial-value information of a given initial value according to one selected from a plurality of predetermined key generation algorithms;

encrypting at least a part of the first-key base information into encryption-resultant first-key base information in response to the second-key signal; and transmitting the encryption-resultant contents information, the encryption-resultant first-key base information, the initial-value information, and algorithm identification information for identifying the one selected from the plurality of predetermined key generation algorithms;

wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

2. A method of recording contents information, comprising the steps of:

generating a first-key signal representative of a first key from first-key base information being a base of the first key;

encrypting contents information into encryption-resultant contents information in response to the first-key signal;

generating a second-key signal representative of a second key on the basis of initial-value information of a given initial value according to one selected from a plurality of predetermined key generation algorithms;

encrypting at least a part of the first-key base information into encryption-resultant first-key base information in response to the second-key signal; and recording the encryption-resultant contents information, the encryption-resultant first-key base information, the initial-value information, and algorithm identification information for identifying the one selected from the plurality of predetermined key generation algorithms;

wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

3. An apparatus for transmitting contents information, comprising:

means for generating a first-key signal representative of a first key from first-key base information being a base of the first key;

means for encrypting contents information into encryption-resultant contents information in response to the first-key signal;

means for generating a second-key signal representative of a second key on the basis of initial-value information of a given initial value according to one selected from a plurality of predetermined key generation algorithms;

means for encrypting at least a part of the first-key base information into encryption-resultant first-key base information in response to the second-key signal; and means for transmitting the encryption-resultant contents information, the encryption-resultant first-key base information, the initial-value information, and algorithm identification information for identifying the one selected from the plurality of predetermined key generation algorithms;

wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

4. An apparatus for recording contents information, comprising:

means for generating a first-key signal representative of a first key from first-key base information being a base of the first key;

means for encrypting contents information into encryption-resultant contents information in response to the first-key signal;

means for generating a second-key signal representative of a second key on the basis of initial-value information of a given initial value according to one selected from a plurality of predetermined key generation algorithms;

means for encrypting at least a part of the first-key base information into encryption-resultant first-key base information in response to the second-key signal; and means for recording the encryption-resultant contents information, the encryption-resultant first-key base information, the initial-value information, and algorithm identification information for identifying the one selected from the plurality of predetermined key generation algorithms;

wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

5. A transmission medium for transmitting encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to one selected from a plurality of predetermined key generation algorithms; and encrypting at least a part of the first-key base information into encryption-resultant first-key base information in response to the second-key signal; and wherein the algorithm identification information is for identifying the one selected from the plurality of predetermined key generation algorithms; and wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

6. A recording medium loaded with encryption-resultant contents information, encryption-resultant first-key base information, initial-value information, and algorithm identification information, wherein the encryption-resultant contents information and the encryption-resultant first-key base information are generated by the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to one selected from a plurality of predetermined key generation algorithms; and encrypting at least a part of the first-key base information into encryption-resultant first-key base information in response to the second-key signal; and wherein the algorithm identification information is for identifying the one selected from the plurality of predetermined key generation algorithms; and wherein it is previously decided that the plurality of predetermined key generation algorithms are usable by a decrypting device in decryption of the encryption-resultant contents information, and the algorithm identification information is for identifying the one among the plurality of predetermined key generation algorithms which should be used by the decrypting device in response to a reference table holding the plurality of predetermined key generation algorithms.

7. An apparatus as recited in claim 3, wherein the means for generating the second-key signal comprises a linear feedback shift register using a specified irreducible primitive polynomial.

8. A method of decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to one selected from a plurality of predetermined key generation algorithms; and encrypting at least a part of the first-key base information into encryption-resultant first-key base information in response to the second-key signal; the method comprising the steps of:

identifying the one selected from the plurality of predetermined key generation algorithms in response to algorithm identification information for identifying the one selected from the plurality of predetermined key generation algorithms;

generating a second-key signal representative of a second key on the basis of the initial-value information and the identified key generation algorithm;

decrypting encryption-resultant first-key base information into original first-key base information in response to the second-key signal;

generating a first-key signal representative of a first key from the original first-key base information; and decrypting encryption-resultant contents information into original contents information in response to the first-key signal;

wherein it is previously decided that the plurality of predetermined key generation algorithms are usable by a decrypting device in decryption of the encryption-resultant contents information, and the plurality of predetermined key generation algorithms are stored in a reference table and the identifying step includes identifying the one among the plurality of predetermined key generation algorithms which should be used by the decrypting device in response to the algorithm identification information by referring to the reference table.

9. An apparatus for decrypting encryption-resultant contents information generated by an encrypting side which implements the steps of generating a first-key signal representative of a first key from first-key base information being a base of the first key; encrypting contents information into encryption-resultant contents information in response to the first-key signal; generating a second-key signal representative of a second key on the basis of initial-value information of a given initial value according to one selected from a plurality of predetermined key generation algorithms; and encrypting at least a part of the first-key base information into encryption-resultant first-key base information in response to the second-key signal; the apparatus comprising:

a reference table storing the plurality of predetermined key generation algorithms identifiable by algorithm identification information, wherein it is previously decided that the plurality of predetermined key generation algorithms are usable by a decrypting device in decryption of the encryption-resultant contents information:

means for identifying the one selected from the plurality of predetermined key generation algorithms in response to the algorithm identification information by referring to the reference table;

means for generating a second-key signal representative of a second key on the basis of the initial-value information and the identified key generation algorithm;

means for decrypting encryption-resultant first-key base information into original first-key base information in response to the second-key signal;

means for generating a first-key signal representative of a first key from the original first-key base information; and means for decrypting encryption-resultant contents information into original contents information in response to the first-key signal.

10. An apparatus as recited in claim 9, wherein the means for generating the second-key signal comprises a linear feedback shift register having a feedback object position which is set in accordance with a primitive polynomial in the identified key generation algorithm.

* * * * *